United States Patent
Sitaraman et al.

(10) Patent No.: US 10,469,371 B2
(45) Date of Patent: Nov. 5, 2019

(54) APPARATUS, SYSTEM, AND METHOD FOR IMPOSING LABEL STACK ENTRIES ON MPLS PACKETS

(71) Applicant: Juniper Networks, Inc., Sunnyvale, CA (US)

(72) Inventors: Harish Sitaraman, Cupertino, CA (US); Raveendra Torvi, Nashua, NH (US); Vishnu Pavan Beeram, Naperville, IL (US); Chandrasekar Ramachandran, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 2 days.

(21) Appl. No.: 15/863,611

(22) Filed: Jan. 5, 2018

(65) Prior Publication Data

US 2018/0367450 A1    Dec. 20, 2018

(51) Int. Cl.
*H04L 12/00* (2006.01)
*H04L 12/723* (2013.01)
*H04L 12/733* (2013.01)

(52) U.S. Cl.
CPC .............. *H04L 45/50* (2013.01); *H04L 45/20* (2013.01)

(58) Field of Classification Search
CPC .................................. H04L 45/50; H04L 45/20
See application file for complete search history.

(56) References Cited

U.S. PATENT DOCUMENTS

2008/0186951 A1*  8/2008  Hirota ..................... H04L 45/00
                                                              370/351
2014/0177638 A1*  6/2014  Bragg ...................... H04L 45/50
                                                              370/395.5

OTHER PUBLICATIONS

Wikipedia; Multiprotocol Label Switching; https://en.wikipedia.org/wiki/Multiprotocol_Label_Switching; May 18, 2017.
Harish Sitaraman, et al.; Apparatus, System, and Method for Sharing Labels Across Label-Switched Paths Within Networks; U.S. Appl. No. 15/493,103, filed Apr. 20, 2017.
Harish Sitaraman et al; Apparatus, System, and Method for Sharing Labels Across Labelswitched Paths Within Networks; U.S. Appl. No. 15/688,813, filed Aug. 28, 2017.

* cited by examiner

*Primary Examiner* — Phuc H Tran
(74) *Attorney, Agent, or Firm* — FisherBroyles, LLP

(57) ABSTRACT

The disclosed system may include (1) receiving, at an ingress node within a network, a request to forward a packet along a label-switched path to an egress node within the network, (2) identifying a limit on the number of labels that the ingress node is capable of forwarding within a label stack of the packet, (3) determining that the number of hops within the label-switched path exceeds the limit on the number of labels that the ingress node is capable of forwarding, (4) selecting at least one of the hops within the label-switched path to act as a delegation node that imposes, onto the label stack of the packet, at least one label corresponding to a downstream hop within the label-switched path and (5) forwarding the packet from the ingress node to the delegation node to enable the delegation node to impose the label onto the label stack.

20 Claims, 8 Drawing Sheets

APPARATUS, SYSTEM, AND METHOD FOR IMPOSING LABEL STACK ENTRIES ON MPLS PACKETS

BACKGROUND

MultiProtocol Label Switching (MPLS) networks often include various paths that facilitate the flow of traffic from a source device to a destination device. In such MPLS networks, these paths may be identified and/or represented by a sequence of labels that correspond to different portions of the paths. For example, a packet may traverse a traditional MPLS network from a source device to a destination device. Along the way, the packet may arrive at an intermediary node that switches the packet's existing label for another label that corresponds to a subsequent hop within the LSP and then forwards the packet. Since labels are often switched in this way as packets traverse traditional MPLS networks, these paths may be referred to as Label-Switched Paths (LSPs).

LSPs may include and/or represent various nodes within a network. Each of these nodes may maintain and/or program both control plane and data plane state or data for the relevant LSPs. For example, a certain network node may represent a portion of 100,000 LSPs. In other words, 100,000 LSPs may include and/or pass through that network node.

In many traditional configurations, the number of data plane states maintained by a network node may be directly proportional to the number of LSPs that include that network node. In other words, such traditional configurations may require the data plane state to remain directly proportional to the control plane state. For example, in the event that a network node represents a portion of 100,000 LSPs, that network node may need to manage 100,000 different labels in the data plane by creating, updating, and/or deleting such labels when changes occur. As a result, the network node may be adding and/or deleting labels to the data plane on a nearly constant basis.

However, a newer MPLS technology may enable LSPs to share labels such that the number of labels needed to support the MPLS LSPs is reduced significantly. With this newer MPLS technology, rather than maintaining the same number of labels as the number of LSPs in the data plane, each network node may only need to maintain the same number of labels as the number of different next hops included in the LSPs.

As a specific example, the network node that represents a portion of 100,000 LSPs may interface with 10 other nodes that represent portions of those 100,000 LSPs. Rather than maintaining 100,000 labels in the forwarding table of the data plane, the network node may only need to maintain 10 different labels that correspond to the other nodes, thereby drastically reducing resource consumption and/or processing demands. As a result, the network node may be able to manage the labels in the forwarding table of the data plane without needing to perform updates so frequently.

In this new MPLS technology, an ingress node (i.e., the beginning node of an LSP) may facilitate transfer of a network packet along the LSP by imposing one or more labels on the packet. For example, the ingress node may insert, into the header of a packet, a label stack that includes at least a portion of the labels that describe hops within the packet's intended LSP. As the packet traverses the LSP, these labels may enable transit nodes within the LSP to appropriately route and/or transfer the packet such that the packet reaches the egress node (i.e., the final node) of the LSP.

Unfortunately, some network nodes utilizing this new MPLS technology may be unable to push and/or impose a sufficient number of labels onto a packet's label stack to enable the packet to be forwarded along the entirety of an LSP. For example, a typical network node may be limited to imposing and/or pushing 5 label stack entries. In the new MPLS technology, a label may be "popped" (e.g., deleted) from the packet's label stack after the packet reaches the node associated with the label. Accordingly, once the packet has traversed five hops, the node at which the packet currently resides may be unable to continue to forward the packet without additional knowledge of the packet's path. As a result, the packet may be unable to reach its intended destination.

The instant disclosure, therefore, identifies and addresses a need for additional apparatuses, systems, and methods for imposing label stack entries on MPLS packets.

SUMMARY

As will be described in greater detail below, the instant disclosure generally relates to apparatuses, systems, and methods for imposing label stack entries on MPLS packets. In one example, a computer-implemented method for imposing such label stack entries may include (1) receiving, at an ingress node within a network, a request to forward a packet along an LSP to an egress node within the network, (2) identifying a limit on the number of labels that the ingress node is capable of forwarding within a label stack of the packet, (3) determining that the number of hops within the LSP path exceeds the limit on the number of labels that the ingress node is capable of forwarding, and then in response to determining that the number of hops within the LSP exceeds the limit on the number of labels that the ingress node is capable of forwarding (4) selecting, based at least in part on the number of labels that the ingress node is capable of forwarding, at least one of the hops within the LSP to act as a delegation node that imposes, onto the label stack of the packet, at least one label corresponding to a downstream hop within the LSP and (5) forwarding the packet from the ingress node to the delegation node along the LSP to enable the delegation node to impose the label onto the label stack as the packet traverses toward the egress node.

As another example, a system for implementing the above-described method may include various modules stored in memory. The system may also include at least one physical processor that executes these modules. For example, the system may include (1) a receiving module that receives, at an ingress node within a network, a request to forward a packet along an LSP to an egress node within the network, (2) an identification module that identifies a limit on the number of labels that the ingress node is capable of forwarding within a label stack of the packet, (3) a determination module that determines that the number of hops within the LSP exceeds the limit on the number of labels that the ingress node is capable of forwarding, (4) a delegation module that in selects, based at least in part on the number of labels that the ingress node is capable of forwarding, at least one of the hops within the LSP to act as a delegation node that imposes, onto the label stack of the packet, at least one label corresponding to a downstream hop within the LSP, and (5) a forwarding module that forwards the packet from the ingress node to the delegation node along the LSP to enable the delegation node to impose the label onto the label stack as the packet traverses toward the egress node.

As a further example, an apparatus for implementing the above-described method may include at least one storage device that stores a plurality of labels that correspond to portions of LSPs within a network. In this example, the apparatus may also include at least one physical processing device communicatively coupled to the storage device within a network node, wherein the physical processing device (1) receives, at an ingress node within a network, a request to forward a packet along an LSP to an egress node within the network, (2) identifies a limit on the number of labels that the ingress node is capable of forwarding within a label stack of the packet, (3) determines that the number of hops within the LSP exceeds the limit on the number of labels that the ingress node is capable of forwarding, and then in response to determining that the number of hops within the LSP exceeds the limit on the number of labels that the ingress node is capable of forwarding (4) selects, based at least in part on the number of labels that the ingress node is capable of forwarding, at least one of the hops within the LSP to act as a delegation node that imposes, onto the label stack of the packet, at least one label corresponding to a downstream hop within the LSP and (5) forwards the packet from the ingress node to the delegation node along the LSP to enable the delegation node to impose the label onto the label stack as the packet traverses toward the egress node.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
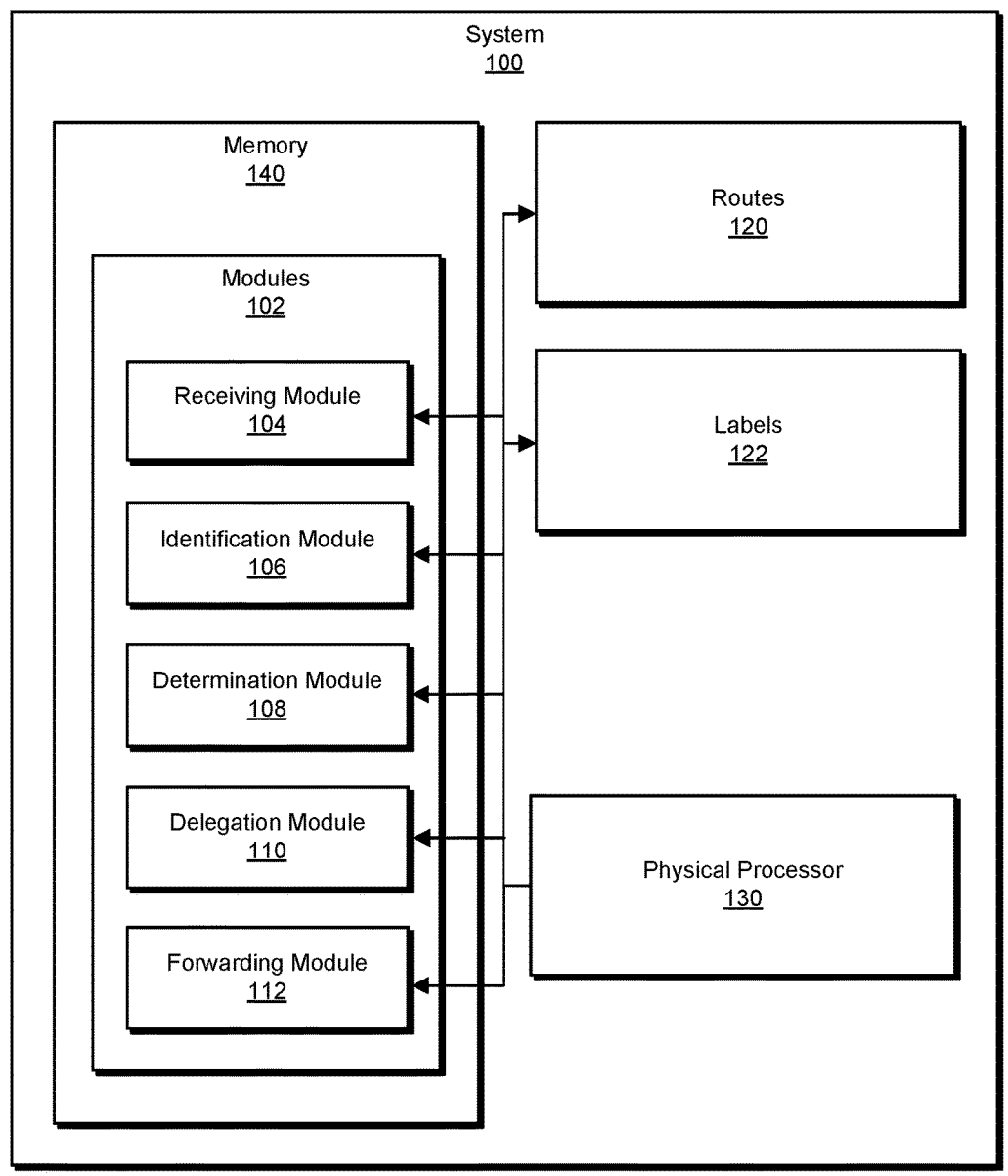
FIG. 1 is a block diagram of an exemplary system for imposing label stack entries on MPLS packets.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for imposing label stack entries on MPLS packets. As will be explained in greater detail below, embodiments of the instant disclosure may impose label stack entries onto packets at nodes within resource ReSerVation Protocol (RSVP)—Traffic Engineering (TE) LSPs that implement a pop-and-forward data plane. These embodiments may enable packets within such LSPS to reach their intended destinations by selecting one or more nodes within an LSP to act a delegation node. As will be explained in greater detail below, a delegation node may impose one or more labels onto a packet's label stack while the packet traverses an LSP, thereby enabling the packet to reach the egress node and/or the next delegation node within the LSP.

Certain LSPs may include a combination of pop-and-forward labels and swap-and-forward labels. In this context, the term "pop-and-forward label" generally refers to a label that is simply removed from a label stack at an intermediary node of an LSP without being replaced by any new label. In contrast, the term "swap-and-forward label" generally refers to a label that is swapped for another label at an intermediary node of an LSP.

In some examples, a network node may be capable of forwarding only a certain number of labels within a label stack. For example, an ingress node of an LSP may be limited to forwarding 3 pop-and-forward transport labels. In this example, the label stack of a packet forwarded from the ingress node may be depleted after the 3 labels have been popped. If the LSP contains more than 3 hops, the packet may be dropped or returned to the ingress node before reaching the egress node of the LSP. Accordingly, embodiments of the instant disclosure may select one or more nodes within the LSP to act as a delegation node that imposes (e.g., pushes) new labels onto the label stack when the packet arrives at the delegation node. By doing so, the disclosed systems may enable the packet to efficiently traverse the entirety of the LSP.

Continuing with this example, the ingress node of the LSP may direct the nodes within the LSP to automatically and/or autonomously select themselves as delegation nodes. For example, the ingress node may forward a path message that traverses the hops within the LSP. This path message may indicate the number of labels each hop is capable of forwarding. Specifically, a hop may calculate the number of labels that it may forward and pass this value onto the next downstream hop via the path message. The downstream hop may calculate its own forwarding limit based on the value received from the previous hop. This iterative process may repeat until a hop within the LSP determines that a packet's label stack will have been depleted by the time the packet reaches the hop. This hop may therefore appoint itself to act as a delegation node.

After the delegation node (and any additional delegation nodes) has been selected, the ingress node of the LSP may establish the LSP such that the selected hop is designated as the delegation node. For example, the ingress node may associate the hop (or a link between the hop and the next downstream hop) with a delegation label. Before forwarding the packet along the LSP, the ingress node may stack the label stack of the packet with labels that enable the packet to reach the delegation node. When the packet reaches the delegation node, the delegation node may impose a new set of labels onto the label stack. These labels may enable the packet to continue traversing the LSP.

The following will provide, with reference to FIGS. 1, 2, and 5-7, detailed descriptions of exemplary systems for imposing label stack entries on MPLS packets. Detailed descriptions of information that identifies different LSPs will also be provided in connection with FIG. 4. Detailed descriptions of corresponding computer-implemented methods will be provided in connection with FIG. 3. In addition, detailed descriptions of an exemplary computing system for carrying out these methods will be provided in connection with FIG. 8.

FIG. 1 is a block diagram of an exemplary system 100 for imposing label stack entries on MPLS packets. As illustrated in this figure, exemplary system 100 may include one or more modules 102 for performing one or more tasks. As will be explained in greater detail below, modules 102 may include a receiving module 104, an identification module 106, a determination module 108, a delegation module 110, and a forwarding module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network nodes 202 and/or 206) and/or the devices illustrated in FIGS. 5-7 (e.g., network nodes 202, 206, 502, 504, 506, 508, 510, 512, 514, 516, 518 and/or 520). In addition, one or more of modules 102 may perform any of the functionality described herein in connection with any of the devices illustrated in FIG. 2 and/or the devices illustrated in FIGS. 5-7. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate providing node protection across LSPs that share labels. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more routes, such as routes 120. In some examples, routes 120 may each identify at least a portion of a particular path (e.g., an LSP) within a network. In such examples, routes 120 may facilitate the flow of traffic within the network. Examples of routes 120 include, without limitation, Address Resolution Protocol (ARP) routes, prefixes, Internet Protocol (IP) routes, IP addresses, Media Access Control (MAC) addresses, variations or combinations of one or more of the same, and/or any other suitable routes.

Exemplary system 100 may further include one or more labels, such as labels 122. In some examples, labels 122 may include and/or represent MPLS labels. In such examples, labels 122 may be assigned and/or attached to traffic and/or individual packets. Labels 122 may indicate and/or correspond to at least a portion of a particular path within a network. Accordingly, routing and/or forwarding decisions may be determined and/or controlled by the particular labels assigned to a packet. For example, a router may receive a packet, identify one of the labels assigned to the packet, and then forward the packet to the next hop corresponding to that particular label.

Figure 2:
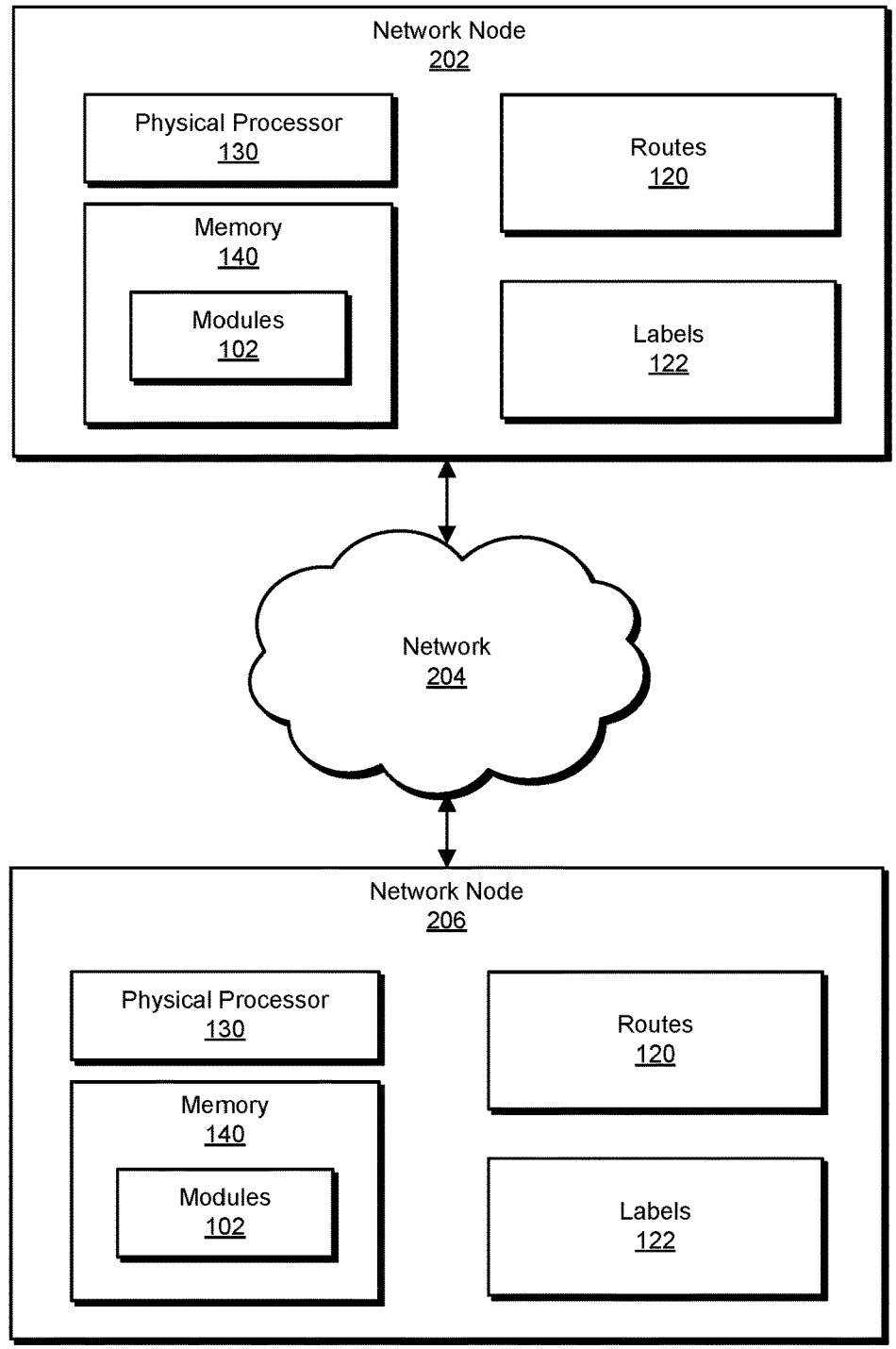
FIG. 2 is a block diagram of an additional exemplary system for imposing label stack entries on MPLS packets.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network node 202 in communication with a network node 206 via a network 204. In one example, all or a portion of the functionality of modules 102 may be performed by network node 202, network node 206, and/or any other suitable computing system. As will be described in greater detail below, one or more of modules 102 from FIG. 1 may, when executed by at least one processor of network node 202 or 206, enable network node 202 or 206 to impose label stack entries on MPLS packets within network 204.

Network nodes 202 and 206 each generally represent any type or form of physical computing device that facilitates communication within a network and/or across networks. In one example, network nodes 202 and 206 may each include and/or represent a router (such as a customer edge router, a provider edge router, a hub router, a spoke router, an autonomous system boundary router, and/or an area border router). Additional examples of network nodes 202 and 206 include, without limitation, switches, hubs, modems, bridges, repeaters, gateways, multiplexers, network adapters, network interfaces, servers, portions of one or more of the same, combinations or variations of one or more of the same, and/or any other suitable network nodes.

Network 204 generally represents any medium or architecture capable of facilitating communication or data transfer. In one example, network 204 may facilitate communication between network nodes 202 and 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, a resource RSVP-TE network, portions of one or more of the same, variations or combinations of one or more of the same, and/or any other suitable network. Although illustrated as being external to network 204 in FIG. 2, network nodes 202 and 206 may each represent a portion of network 204 and/or be included in network 204.

Figure 3:
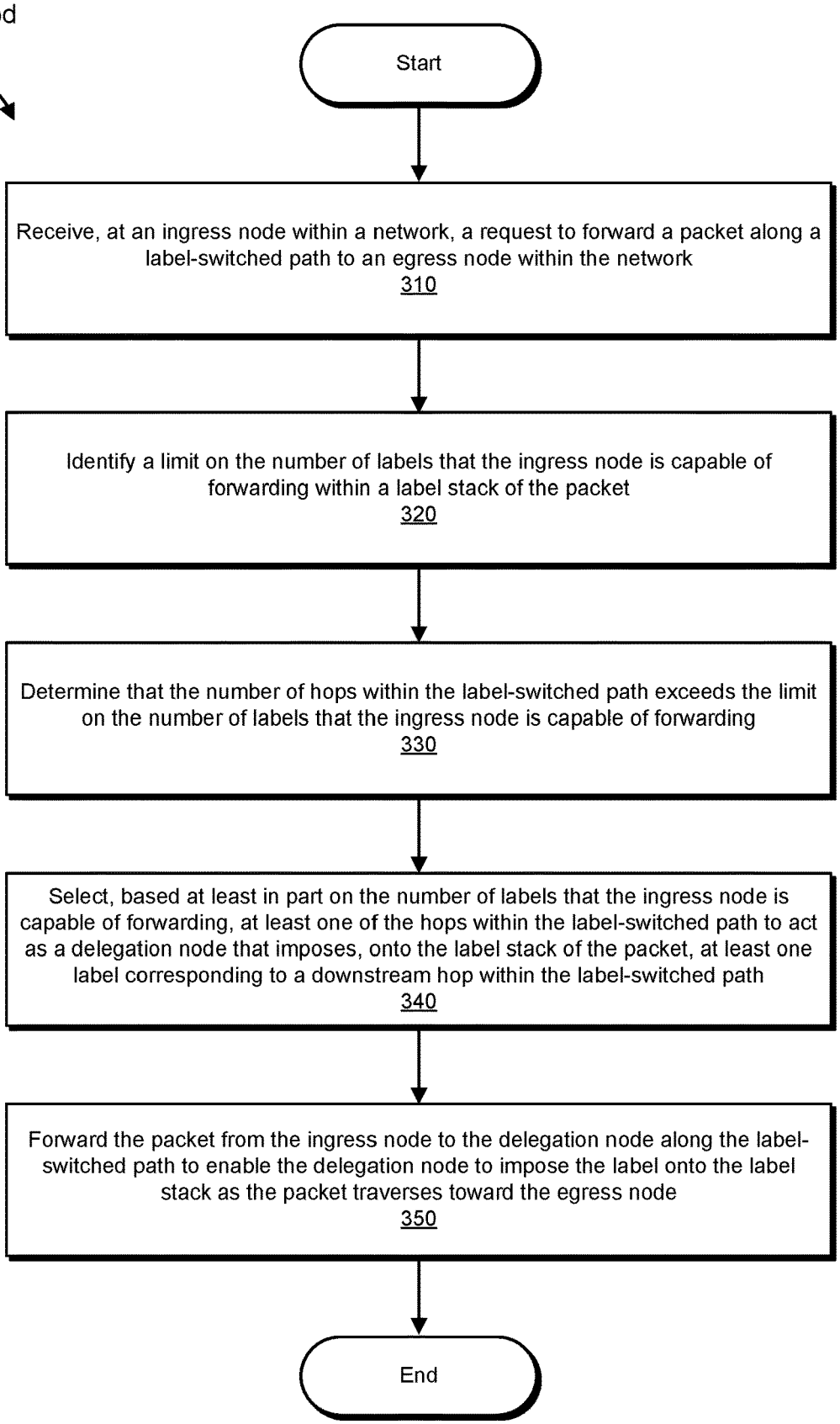
FIG. 3 is a flow diagram of an exemplary method for imposing label stack entries on MPLS packets.

FIG. 3 is a flow diagram of an example computer-implemented method 300 for imposing label stack entries on MPLS packets. The steps shown in FIG. 3 may be performed by any suitable computer-executable code and/or computing system, including system 100 in FIG. 1, system 200 in FIG. 2, system 500 in FIG. 5, system 600 in FIG. 6, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the apparatuses and/or systems described herein may receive, at an ingress node within a network, a request to forward a packet along an LSP to an egress node within the network. For example, receiving module 104 may, as part of network node 202 in FIG. 2 or 5-7, receive a request to forward a packet along an LSP to network node 206 in FIG. 2 or 5-7. In this example, network node 202 may represent the ingress node and network node 206 may represent the egress node of the LSP illustrated in FIGS. 5-7.

The term "ingress node," as used herein, generally refers to any physical computing device that represents the node at which an LSP begins and/or originates. The term "egress node," as used herein, generally refers to any physical computing device that represents the final hop and/or final destination node of an LSP. In addition, the term "packet," as used herein, generally refers to any type or form of communication package, encapsulation, abstraction, and/or object that includes one or more formatted units of data. The term "apparatus," as used herein, generally refers to any portion and/or set of components in a computing device and/or system capable of performing and/or facilitating the disclosed methods for imposing label stack entries on MPLS packets.

The systems described herein may perform step 310 in a variety of different ways and/or contexts. In some examples, receiving module 104 may monitor traffic arriving at network node 202. While monitoring such traffic, receiving module 104 may detect and/or receive an incoming packet from network node 202. Receiving module 104 may then determine (e.g., based on information within a header of the packet) that the packet is destined at least intermediately for network node 206. In some embodiments, receiving a packet destined for network node 206 may represent and/or amount to a request to route the packet along an LSP to network node 206.

Additionally or alternatively, receiving module 104 may receive a request to establish the LSP that begins at network node 202 and ends at network node 206. For example, receiving module 104 may receive, from a controller and/or another network node, a request to assign and/or establish labels that correspond to links within the LSP.

Returning to FIG. 3, at step 320 one or more of the apparatuses and/or systems described herein may identify a limit on the number of labels that the ingress node is capable of forwarding within a label stack of the packet. For example, identification module 106 may, as part of network node 202 in FIG. 2 or 5-7, identify a limit on the number of labels network node 202 is capable of forwarding within a label stack of the packet. In this example, the label stack may include multiple labels that collectively represent at least a portion of an LSP within the network of exemplary system 500 in FIG. 5, exemplary system 600 in FIG. 6, or exemplary system 700 in FIG. 7. The term "label stack," as used herein, generally refers to any collection of labels that each identify a certain segment or link of an LSP.

The systems described herein may perform step 320 in a variety of different ways and/or contexts. In some examples, identification module 106 may determine that network node 202 is capable of handling and/or forwarding only a certain number of labels within outgoing label stacks. In one embodiment, this constraint may be an inherent property of network node 202 (e.g., based on the configuration and/or setup of network node 202). Additionally or alternatively, this constraint may be based on factors such as the protocol used by network node 202 to forward packets, the type of packet that network node 202 is to forward, and/or the type of network in which network node 202 resides.

In some embodiments, identification module 106 may determine that a label stack of a packet to be forwarded from network node 202 contains a variety of types of labels. For example, identification module 106 may determine that the label stack contains both transport labels (i.e., labels corresponding to links that identify and/or lead to hops within an LSP) and additional types of labels not directly related to links within an LSP (such as application labels). In this example, identification module 106 may determine the limit on the number of labels network node 202 is capable of forwarding based on the number of labels directly corresponding to links within the LSP that network node 202 is capable of forwarding.

As an example, identification module 106 may determine that network node 202 is capable of forwarding 5 total labels within a label stack of a packet. However, identification module 106 may determine that 2 of these labels are application labels or additional transport labels not directly related to links within an LSP. As such, identification module 106 may determine that the relevant number of labels network node 202 is capable of forwarding is 3.

Returning to FIG. 3, at step 330 one or more of the apparatuses and/or systems described herein may determine that the number of hops within the LSP exceeds the limit on the number of labels that the ingress node is capable of forwarding. For example, determination module 108 may, as part of network node 202 in FIG. 2 or 5-7, determine that the number of hops within the LSP between network node 202 and network node 206 exceeds the limit on the number of labels that network node 202 is capable of forwarding.

The term "number of hops within an LSP," as used herein, generally refers to the number of network nodes within an LSP traversed by a packet after the packet is forwarded from the ingress node of the LSP. For example, the number of hops within an LSP may correspond to the number of different nodes within the LSP, not including the ingress node. Accordingly, the number of hops within the LSP may be the same as the number of labels required to forward a packet along the entirety of the LSP.

The systems described herein may perform step 330 in a variety of different ways and/or contexts. In some examples, determination module 108 may determine the number of hops between network node 202 and network node 206 based on a label stack and/or additional information within a header of a packet to be forwarded to network node 206. Additionally or alternatively, determination module 108 may determine the number of hops by querying nodes between network node 202 and network node 206 and/or based on prior knowledge of these nodes.

After determining the number of hops within the LSP, determination module 108 may compare this number to the limit on the number of labels that network node 202 is capable of forwarding. In some embodiments, this comparison may indicate that the number of hops exceeds the forwarding limit of network node 202. For example, determination module 108 may determine that an LSP between network node 202 and network node 206 contains 11 hops and that network node 202 is only capable of forwarding 3 labels. Determination module 108 may therefore determine that a label stack containing 3 pop-and-forward transport labels is not sufficient to facilitate forwarding a packet along the LSP to network node 206. For example, determination module 108 may determine that the label stack will be depleted after the third hop in the LSP.

In other embodiments, determination module 108 may determine that the number of hops within an LSP does not exceed the limit on the number of labels that network node 202 is capable of forwarding. For example, determination module 108 may determine that an LSP contains 4 hops and that network node 202 is capable of forwarding 4 labels. In these examples, the disclosed systems may determine that a packet traversing the LSP is able to reach the egress node of the LSP using the labels included within the original label stack of the packet. Determination module 108 may therefore determine that appointing a delegation node within the LSP is unnecessary.

Returning to FIG. 3, at step 340 one or more of the apparatuses and/or systems described herein may select, based at least in part on the number of labels that the ingress node is capable of forwarding, at least one of the hops within the LSP to act as a delegation node that imposes, onto the label stack of the packet, at least one label corresponding to a downstream hop within the LSP. For example, delegation module 110 may, as part of network node 202 in FIG. 2 or 5-7, select at least one of the hops within the LSP between network node 202 and network node 206 to act as a delegation node that imposes, onto the label stack of the packet, at least one label corresponding to a downstream hop within the LSP. This selection may be based at least in part on the number of labels that network node 202 is capable of forwarding. In this example, selecting the hop to act as the delegation node may be performed in response to determining that the number of hops within the LSP exceeds the limit on the number of labels that network node 202 is capable of forwarding.

The term "delegation node," as used herein, generally refers to any node within an LSP that imposes (e.g., adds) one or more labels to a label stack of a packet as the packet traverses the LSP. In some examples, a delegation node may be located within the middle of an LSP (as opposed to the ingress node of the LSP). A delegation node may add any suitable number of labels onto a label stack of a packet. For example, a delegation node may impose the maximum number of labels that the node is capable of forwarding. Additionally or alternatively, a delegation node may impose enough labels to enable a packet to reach the egress node of an LSP and/or the next delegation node within the LSP. Moreover, while the disclosed systems may describe delegation nodes in the context of pop-and-forward data planes, delegation nodes may be utilized and/or implemented in any additional or suitable type of network and/or protocol.

The systems described herein may perform step 340 in a variety of different ways and/or contexts. In some examples, delegation module 110 may select a hop to act as a delegation node based at least in part on an effective transport label-stack depth (ETLD) of the hop. The term "ETLD," as used herein, generally refers to the number of labels that a hop is capable of forwarding within an LSP.

In some examples, the ETLD of an ingress node may correspond to the maximum number of transport labels the ingress node is capable of forwarding. However, the ETLD of a hop in the middle of an LSP may be limited and/or controlled by the number of labels within a label stack of a packet received by the hop. For example, if the hop receives a packet with a label stack containing 3 pop-and-forward labels, the hop may pop one label from the label stack before forwarding the packet. As such, the ETLD of the hop cannot exceed 2. In this way, the ETLD of a hop within an LSP may be directly related to and/or constrained by the ETLD of the closest upstream hop.

The ETLD of a hop may also be constrained by the number of remaining hops within an LSP. For example, a hop within an LSP may be capable of forwarding up to 5 labels in certain circumstances. However, in the event that the LSP contains less than 5 hops downstream from the hop, the ETLD of the hop may be limited by and/or correspond to the number of remaining downstream hops.

In some examples, delegation module 110 may select a hop to act as a delegation node based on determining that the ETLD of the hop is 0. In other words, delegation module 110 may select a hop within an LSP to act as a delegation node based on determining that the label stack of a packet will have been depleted by the time the packet reaches the hop. Delegation module 110 may therefore determine that the hop should impose new labels onto the label stack to enable the packet to traverse further along the LSP.

In some embodiments, network node 202 may determine the ETLD of all or a portion of the hops within an LSP. For example, while hosted on network node 202, delegation module 110 may query each individual hop to determine the ETLD of the hops. Additionally or alternatively, delegation module 110 may have previous knowledge of the ETLD of each hop. In these examples, delegation module 110 may select one or more particular hops within the LSP to act as a delegation node while running on network node 202.

However, in other embodiments, delegation module 110 may direct a hop to determine whether it should act as a delegation node. For example, because obtaining the ETLD of each hop within an LSP at network node 202 may be difficult and/or time-consuming, network node 202 may direct hops within an LSP to automatically and/or autonomously select themselves to act as delegation nodes. In one embodiment, each hop within an LSP may calculate its own ETLD. In the event that a hop determines that its ETLD is 0, the hop may select itself to act as a delegation node.

In some embodiments, a hop within an LSP may determine its ETLD based on receiving the ETLD of the closest upstream hop. For example, after a hop within an LSP determines its ETLD, the hop may pass the ETLD onto the next downstream hop within the LSP. The downstream hop may then determine its ETLD by subtracting 1 from the ETLD of the upstream hop. This iterative process may continue until a hop within the LSP determines that its ETLD is 0. For example, the hop may assign itself to act as a delegation node in response to receiving a message that indicates the ETLD of the upstream hop is 1.

In some examples, a hop may reset its ETLD after determining that the hop is to act as a delegation node. In one embodiment, a hop may reset its ETLD by determining the number of new labels the hop is capable of imposing onto a label stack of a packet (e.g., the maximum number of transport labels the hop is capable of forwarding). In these examples, the iterative process of determining ETLDs may then repeat. For example, the hop selected to act as a delegation node may pass its new ETLD to the next downstream hop, and the downstream hop may use the received ETLD to calculate its own ETLD. In some embodiments, this process may continue until each node within the LSP has determined its ETLD (e.g., until the process has reached network node 206). Notably, in some examples, more than one hop within an LSP may be selected to act as a delegation node.

In some embodiments, delegation module 110 may indicate the ETLD of network node 202 to the next downstream hop within the LSP via a path message. This path message may also contain a signal (e.g., a flag) that prompts the downstream hop to determine whether the hop should act as a delegation node. For example, in response to identifying the signal, the downstream hop may calculate its ETLD and forward the ETLD to the next downstream hop via the path message. In one embodiment, the path message may represent an RSPVP-TE message that traverses along the LSP until reaching network node 206.

In some examples, delegation module 110 may facilitate establishing an LSP containing one or more delegation nodes. For example, an instance of delegation module 110 on network node 206 may receive a path message initiated by network node 202. In response, the instance of delegation module 110 may forward a reservation message back along the LSP toward network node 202. In one embodiment, this reservation message may include and/or represent an RSVP-TE message.

After a hop within the LSP receives the reservation message, an instance of delegation module 110 on the hop may add a label to the reservation message. This label may indicate or identify a link leading from the hop to the next downstream hop within the LSP (e.g., the hop from which the reservation message was just forwarded). In addition, the hop may indicate whether the label is a pop-and-forward label or a delegation label. As will be explained in greater detail below, a delegation label may indicate, to a hop that identifies the label within a label stack, that the hop is to act as a delegation node. For example, the delegation label may indicate that the hop should impose new labels onto the label stack rather than pop a label from the label stack.

In one embodiment, delegation module 110 may add a label to a label object of a reservation message. In other embodiments, delegation module 110 may add the label to a label sub-object in the record-route object of the reservation message. Additionally or alternatively, the label sub-object in the record-route object may include a flag bit that denotes and/or indicates the type of label. Furthermore, delegation module 110 may store the label of a hop in connection with the link corresponding to the label in a routing table of the control plane of the hop. Additionally or alternatively, delegation module 110 may store the label in connection with the link in the forwarding table of the data plane of the hop.

After delegation module 110 receives a reservation message at network node 202, delegation module 110 may establish the LSP based on the labels added to the reservation message. For example, delegation module 110 may parse and/or record all of the labels included in the reservation message. By doing so, delegation module 110 may enable network node 202 to add all or a portion of the labels onto the label stacks of incoming packets that are destined for network node 206.

Figure 4:
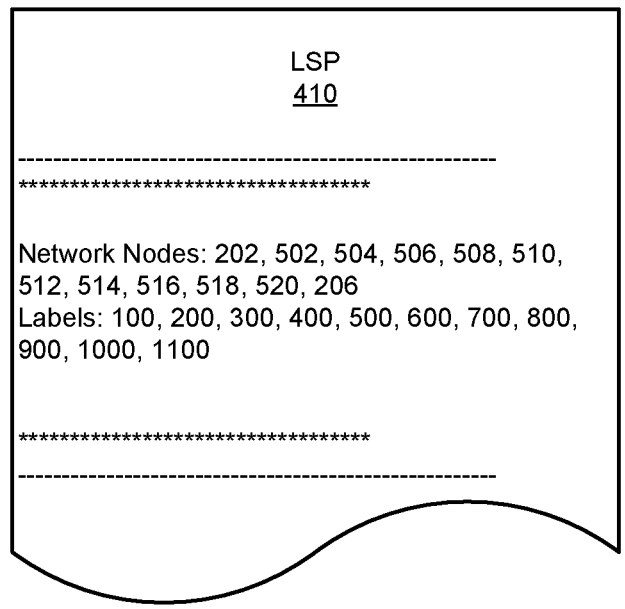
FIG. 4 is an illustration of information that identifies LSPs.

FIG. 4 describes various network nodes and corresponding labels that define and/or are included within an exemplary LSP 410. As shown in FIG. 4, LSP 410 may contain network nodes 202, 502, 504, 506, 508, 510, 512, 514, 516, 518, 520, and 206. In this example, each link from one hop to the next downstream hop within LSP 410 may correspond to and/or be identified by one of labels 100, 200, 300, 400, 500, 600, 700, 800, 900, 1000, or 1100.

Figure 5:
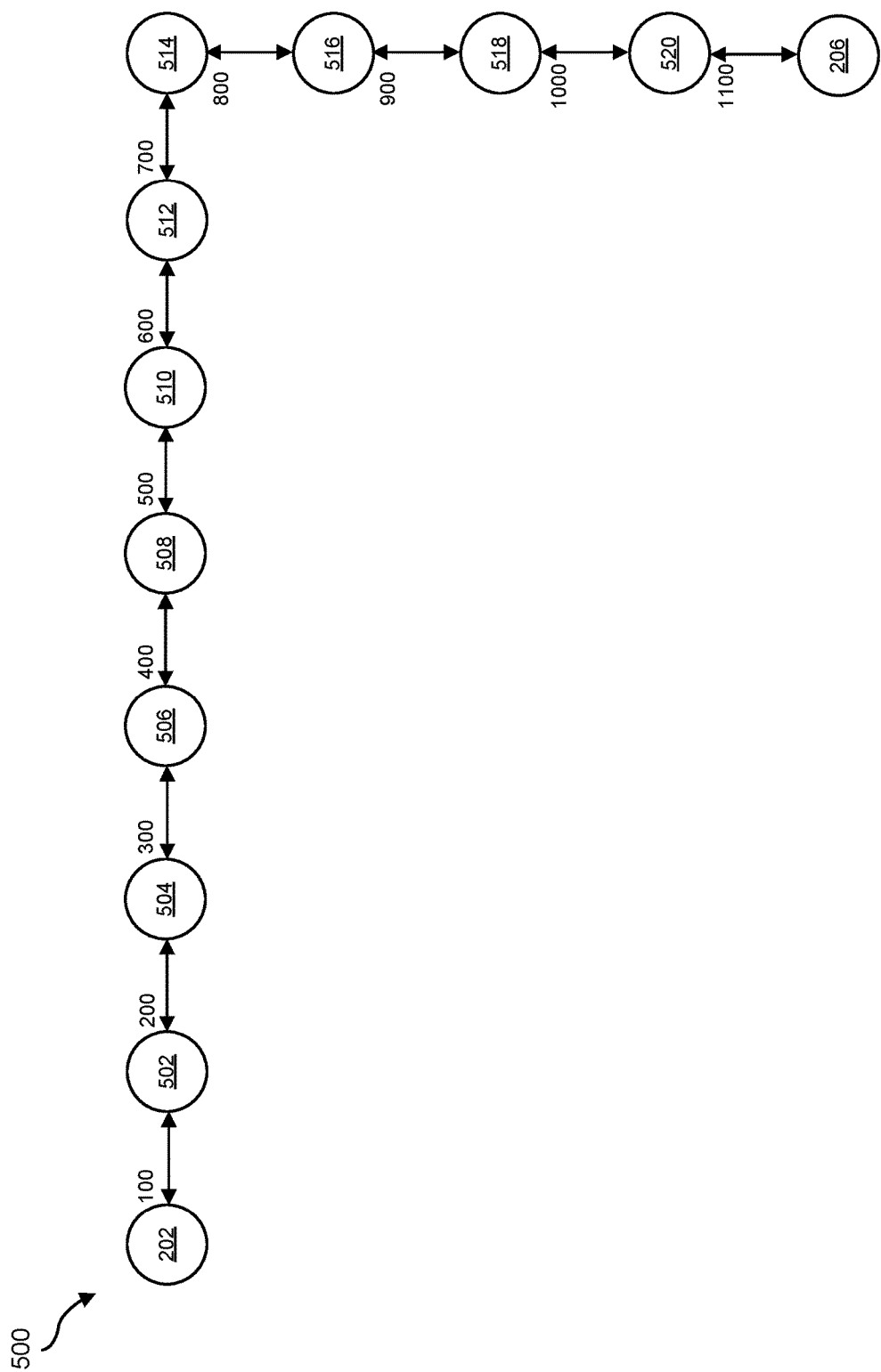
FIG. 5 is a block diagram of an additional exemplary system for imposing label stack entries on MPLS packets.

FIG. 5 shows an exemplary system 500 that includes LSP 410. In the example of FIG. 5, LSP 410 does not contain any delegation nodes. For example, identification module 106 may determine that network node 202 (i.e., the ingress node of LSP 410) is capable of forwarding 11 transport pop-and-forward labels. In addition, determination module 108 may determine that LSP 410 contains 11 hops. As such, determination module 108 may determine that it is not necessary for LSP 410 to implement a delegation node in order for packets to traverse from network node 202 to network node 206. Accordingly, each label within LSP 410 in FIG. 5 may be a pop-and-forward label.

Figure 6:
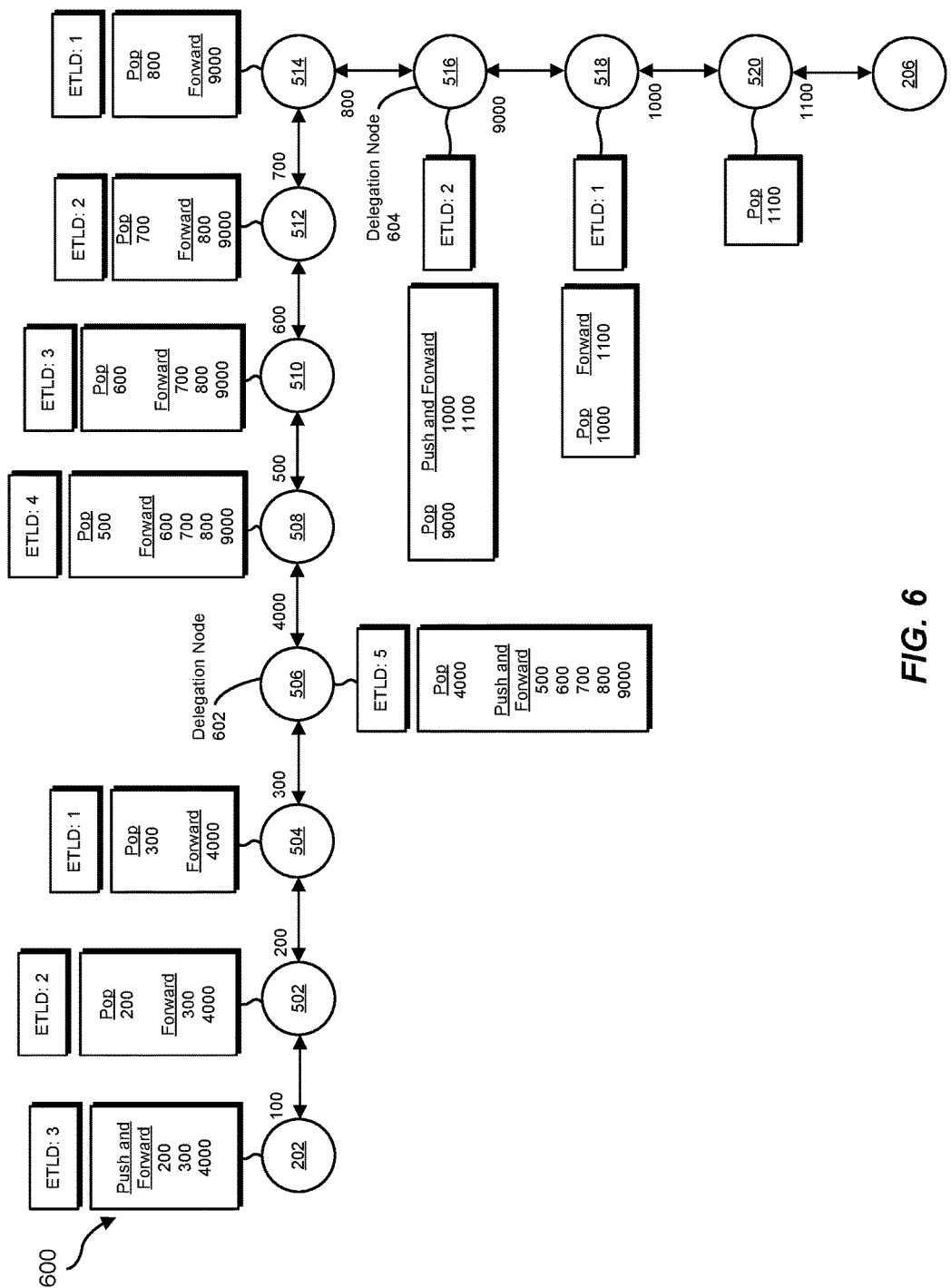
FIG. 6 is a block diagram of an additional exemplary system for imposing label stack entries on MPLS packets.

FIG. 6 illustrates a system 600 that includes an additional example of LSP 410. In the example of FIG. 6, one or more of the hops within LSP 410 may act as delegation nodes. This example illustrates one method of selecting the delegation nodes within LSP 410. In particular, FIG. 6 illustrates a method that may be referred to as "stacking to reach a delegation node." In general, this method may involve selecting the furthest possible downstream hop within an LSP to act as the first delegation node of the LSP.

In the example of FIG. 6, identification module 106 may determine that network node 202 is capable of forwarding 3 transport labels. Accordingly, as shown in FIG. 6, the ETLD of network node 202 is 3. In this example, network node 202 may pass this ETLD to network node 502 via a path message. The path message may prompt network node 502 to subtract 1 from the ETLD of network node 202, which results in an ETLD of 2 for network node 502. Network node 502 may then pass this value to network node 504, which may use the value to calculate an ETLD of 1 for network node 504. After receiving the path message from network node 504, network node 506 may determine that its own ETLD is 0. Network node 506 may therefore determine that it should act as a delegation node (i.e., a delegation node 602).

After determining that network node 506 should act as delegation node 602, network node 506 may reset its ETLD. In the example of FIG. 6, network node 506 may determine that its new ETLD is 5. In this example, the new ETLD of network node 506 may be greater than the ETLD of network node 202 because network node 506 is not an ingress node. For example, both nodes may be capable of forwarding 5 total labels. However, the ingress node of LSP 410 may be required to forward 2 application labels that nodes in the middle of LSP 410 are not required to forward.

After determining the new ETLD for network node 506, network node 506 may forward the ETLD to network node 508. Network node 508 may then forward its ETLD to network node 510. This process may continue until network node 516 selects itself to act as a delegation node (i.e., a delegation node 604). As with network node 506, network node 516 may reset its ETLD. In the example of FIG. 6, network node 516 may be capable of imposing 5 labels onto a label stack. However, network node 516 may determine that only 2 more labels are required to enable a packet to reach network node 206 within LSP 410. As such, network node 516 may determine that its new ETLD is 2. Network node 516 may pass this ETLD to network node 518 to continue the process of determining ETLDs for each hop within LSP 410. This process may terminate at network node 206.

After the delegation nodes within LSP 410 have been selected, network node 206 may forward a reservation message to network node 520. Network node 520 may then add, to the reservation message, a label (i.e., label 1100) that corresponds to the link from network node 520 to network node 206. Network node 520 may also indicate, within the reservation message, that label 1100 is a pop-and-forward label. Network node 520 may then forward the reservation message to network node 518, which may add pop-and-forward label 1000 to the reservation message.

When network node 516 (acting as delegation node 604) receives the reservation message, network node 516 may add label 9000 to the reservation message. In this example, network node 516 may indicate that label 9000 is a delegation label (in contrast to label 900 in FIG. 5, which represents a pop-and-forward label). In some examples, network node 516 may determine which labels network node 516 is to impose on label stacks of packets traversing LSP 410 based on the labels already added to the reservation message. For example, network node 516 may determine that it should impose labels 1000 and 1100.

The process of adding labels to the reservation message may continue until the reservation message reaches network node 202. Once network node 202 receives the reservation message, network node 202 may establish LSP 410 based on the labels included within the reservation message. In the example of FIG. 6, network node 202 may determine that network node 506 added delegation label 4000 to the reservation message (in contrast to pop-and-forward label 400 in FIG. 5). In addition, network node 506 may determine that it should impose labels 500, 600, 700, 800, and 9000 when acting as delegation node 602.

Figure 7:
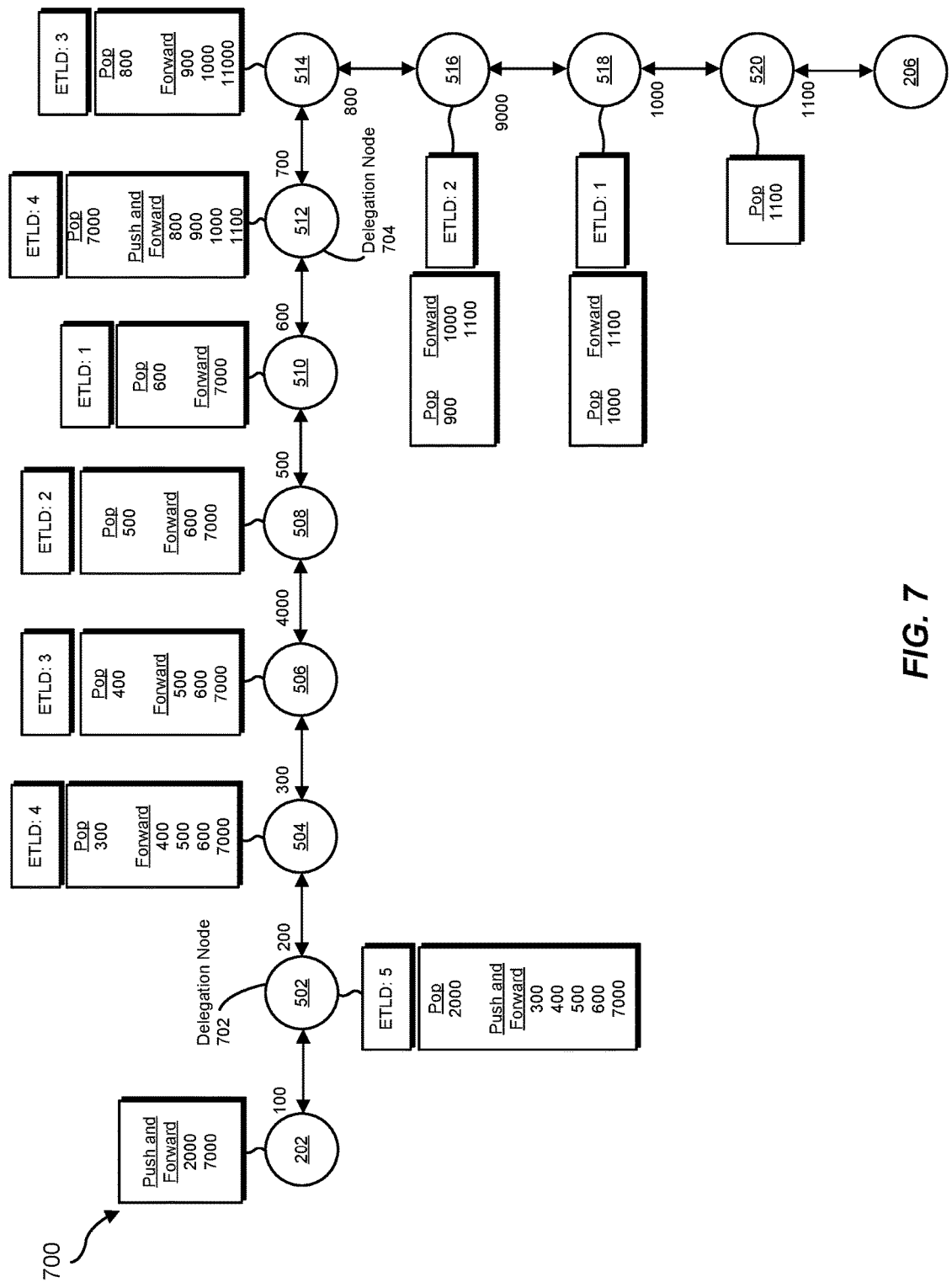
FIG. 7 is a block diagram of an additional exemplary system for imposing label stack entries on MPLS packets.

FIG. 7 shows a system 700 that illustrates an additional method of selecting the delegation nodes within LSP 410. In particular, FIG. 7 illustrates a method that may be referred to as "stacking to reach the egress node." In general, this method may involve an ingress node populating a label stack of a packet with labels that correspond to each delegation node within an LSP.

In the example of FIG. 7, network node 202 may select the first downstream hop within LSP 410 (i.e., network node 502) to act as the first delegation node within LSP 410 (i.e., a delegation node 702). In general, the first delegation node may be any hop that is in accordance with the ETLD of network node 202. However, selecting a hop next to and/or close to network node 202 to act as the first delegation node may maximize the number of delegation nodes that LSP 410 contains. For example, when establishing LSP 410 based on the "stacking to reach the egress node" method, including a pop-and-forward label within the labels forwarded by network node 202 may reduce the number of delegation labels forwarded (and therefore reduce the number of delegation nodes that may be included within LSP 410).

After selecting network node 502 as the first delegation node within LSP 410, the process of selecting additional delegation nodes may be generally the same and/or similar to the process described in connection with FIG. 6. For example, network node 502 may calculate its ETLD (i.e., 5) and then pass this ETLD to network node 504 via a path message. Network node 504 may then calculate its own ETLD based on the ETLD of network node 502 and pass the ETLD to network node 506. This process may continue until network node 512 receives the ETLD of 1 from network node 510. Network node 512 may then select itself to act as a delegation node 704. In addition, network node 512 may reset its ETLD to 4 based on the number of remaining hops within LSP 410. Network node 512 may pass the ETLD of 4 to network node 516 to continue the process of determining ETLDs for each hop within LSP 410. This process may terminate at network node 206.

After the delegation nodes within LSP 410 have been selected, network node 206 may generate a reservation message that is to be forwarded along each hop of LSP 410 until reaching network node 202. As described in connection with FIG. 6, each hop within LSP 410 may add an appropriate label (e.g., either a pop-and-forward label or a delegation label) to the reservation message. Once network node 202 receives the reservation message, network node 202 may establish LSP 410 based on the labels included within the reservation message.

Returning to FIG. 3, at step 350 one or more of the apparatuses and/or systems described herein may forward the packet from the ingress node to the delegation node along the LSP to enable the delegation node to impose the label onto the label stack as the packet traverses toward the egress node. For example, forwarding module 112 may, as part of network node 202 in FIG. 2 or 5-7, forward the packet from network node 202 to the delegation node along the LSP to enable the delegation node to impose the label onto the label stack as the packet traverses toward network node 206. In this example, forwarding module 112 may forward the packet along the LSP after appropriate delegation nodes have been selected within the LSP and/or network node 202 has established the LSP.

The systems described herein may perform step 350 in a variety of different ways and/or contexts. In some examples, forwarding module 112 (at network node 202) may populate the label stack of a packet with one or more labels that enable the packet to reach at least the first delegation node within an LSP. For example, forwarding module 112 may push the labels onto the label stack and then forward the labels with the packet. The packet may then traverse along the LSP until reaching a delegation node. The delegation node may then push an additional set of labels onto the label stack, thereby enabling the packet to continue traversing the LSP. This process may continue until the packet reaches network node 206.

As explained above, FIG. 6 illustrates the method of "stacking to reach a delegation node." In this example, network node 202 may push pop-and-forward labels 200 and 300 and delegation label 4000 onto the label stack of a packet that is to traverse LSP 410. Network node 202 may then forward the packet to network node 502. Upon receiving the packet, network node 502 may pop label 200 from the label stack such that the label stack contains only labels 300 and 4000. Network node 502 may then forward the packet with the label stack to network node 504. Upon receiving the packet, network node 504 may pop label 300 from the label stack such that the label stack contains only label 4000. Network node 504 may then forward the packet along with label 4000.

In the example of FIG. 6, network node 506 may receive the packet and identify label 4000 within the label stack of the packet. In response to determining that label 4000 is a delegation label, network node 506 may pop label 4000 from the label stack and push labels 500, 600, 700, 800, and 9000 onto the label stack. This new set of labels may enable the packet to reach network node 516. Upon receiving the packet, network node 516 may identify label 9000 within the label stack. In response, network node 516 may pop label 9000 and push labels 1000 and 1100 onto the label stack. This new set of labels may enable the packet to reach network node 206.

As explained above, FIG. 7 illustrates the method of "stacking to reach the egress node." In accordance with this method, network node 202 may push each delegation label that corresponds to a delegation node within LSP 410 onto the label stack of a packet that is to traverse LSP 410. In the example of FIG. 6, network node 202 may push delegation labels 2000 and 7000 onto the label stack. In other examples, network node 202 may also impose one or more pop-and-forward labels onto the label stack (e.g., in the event that the first delegation node within LSP 410 is not the closest downstream hop).

In the example of FIG. 6, network node 202 may forward the packet to network node 502. Upon receiving the packet, network node 502 may identify label 2000 within the label stack. In response, network node 502 may pop label 2000 from the label stack (leaving delegation label 7000) and push labels 300, 400, 500, and 600 onto the label stack. The new labels imposed by network node 502 may enable the packet to reach network node 512. Upon receiving the packet, network node 512 may identify label 7000 within the label stack. In response to identifying label 7000, network node 512 may pop label 7000 from the label stack and push labels 800, 900, 1000, and 1100 onto the label stack. This new set of labels may enable the packet to reach network node 206.

Both methods described in connection with FIGS. 6 and 7 may enable a packet to efficiently traverse a LSP that contains one or more delegation nodes. However, these methods may provide a variety of different features and/or advantages. For example, delegation nodes configured based on the "stacking to reach the egress node" method only impose pop-and-forward labels. Referring to the example of FIG. 7, this property may enable delegation label 2000 to be shared by each LSP that forwards packets along the links corresponding to labels 300, 400, 500, and 600. In contrast, delegation nodes configured based on the "stacking to reach a delegation node" may impose one or more delegation labels in addition to pop-and-forward labels. Referring to FIG. 6, this property may prevent an LSP from sharing delegation label 4000 if the LSP does not traverse the links corresponding to each pop-and-forward label associated with delegation label 9000.

While the "stacking to reach the egress node" method may enable greater sharing of delegation labels across LSPs, this method may impose and/or result in restrictions on the length of an LSP. For example, this method may limit the number of delegation nodes within an LSP based on the ETLD of the ingress node. Referring to the example of FIG. 7, network node 202 may push only 3 delegation labels and therefore the length of LSP 410 may be limited based on the ETLDs of the corresponding delegation nodes. However, in the "stacking to reach a delegation node" method illustrated in FIG. 6, LSP 410 may contain any number of hops. Based on these features and/or any additional features of the disclosed methods, an ingress node, a controller, and/or a network administrator may select the most suitable method for appointing delegation nodes within a pop-and-forward LSP.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Figure 8:
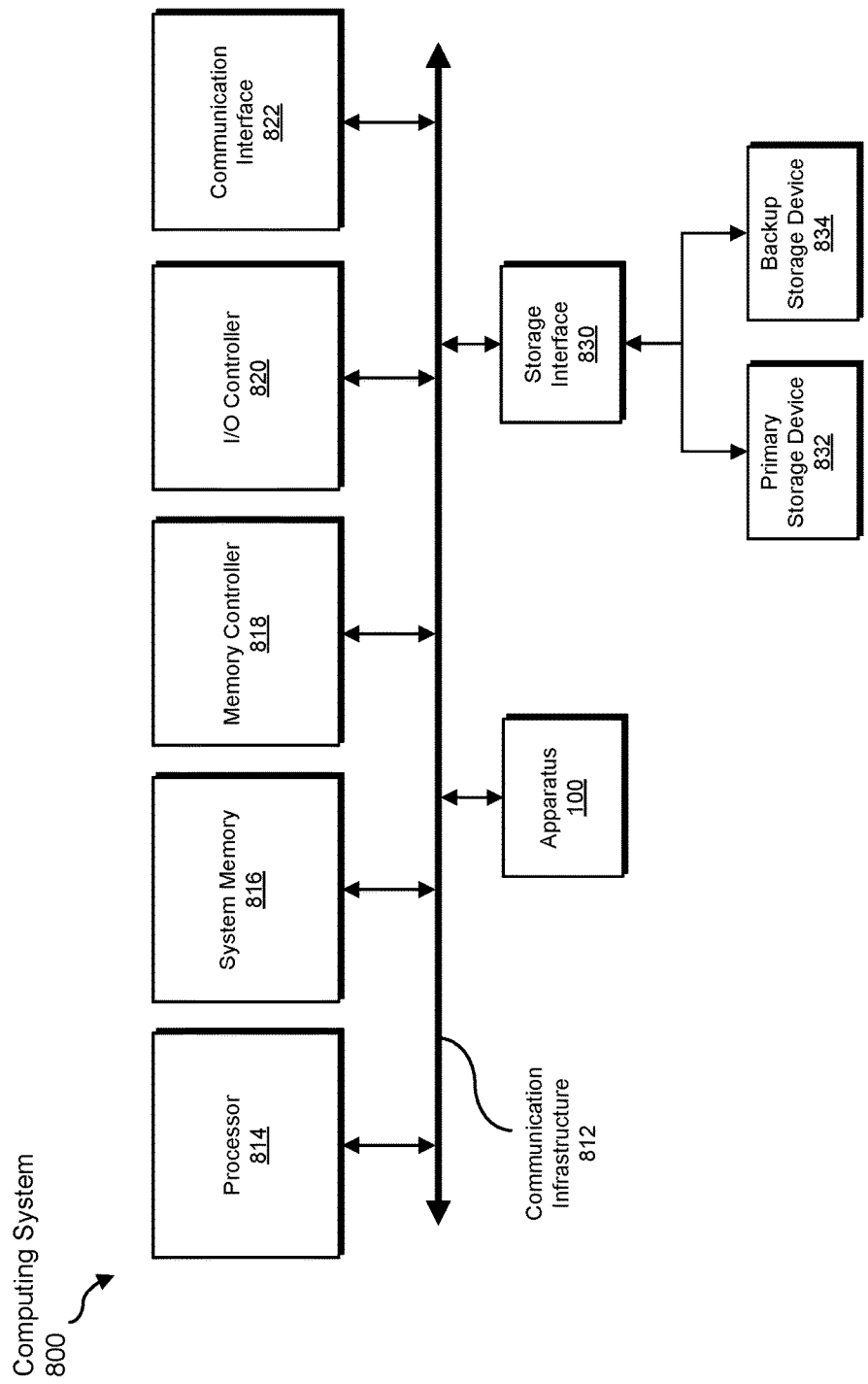
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, at an ingress node within a network, a request to forward a packet along a label-switched path to an egress node within the network;
   identifying a limit on the number of labels that the ingress node is capable of forwarding within a label stack of the packet;
   determining that the number of hops within the label-switched path exceeds the limit on the number of labels that the ingress node is capable of forwarding; and
   in response to determining that the number of hops within the label-switched path exceeds the limit on the number of labels that the ingress node is capable of forwarding:
   selecting, based at least in part on the number of labels that the ingress node is capable of forwarding, at least one node within the label-switched path to act as a delegation node that imposes, onto the label stack of the packet, at least one label corresponding to a downstream node within the label-switched path; and
   forwarding the packet from the ingress node to the delegation node along the label-switched path to enable the delegation node to impose the label onto the label stack as the packet traverses toward the egress node.

2. The method of claim 1, further comprising:
   receiving the packet at one of the nodes within the label-switched path as the packet traverses toward the egress node;
   popping, from the label stack of the packet, a label that corresponds to a link that leads to a subsequent node within the label-switched path; and
   upon popping the label from the label stack, forwarding the packet from the node to the subsequent node by way of the link.

3. The method of claim 2, further comprising determining, for at least a portion of the nodes within the label-switched path, an effective transport label-stack depth (ETLD) that indicates the number of labels the node is capable of forwarding.

4. The method of claim 3, wherein forwarding the packet comprises forwarding both:
   labels that correspond to links within the label-switched path; and
   additional labels that do not correspond to links within the label-switched path; and
   the ETLD of the ingress node is determined by subtracting, from the total number of labels the ingress node is capable of forwarding, the number of labels the ingress node forwards that do not correspond to links.

5. The method of claim 4, further comprising performing an iterative process of determining ETLDs of nodes within the label-switched path by:
   receiving, at a node from the closest upstream node, the ETLD of the closest upstream node;
   determining, at the node the ETLD of the node by subtracting one from the ETLD of the closest upstream node; and
   passing the ETLD of the node to the next downstream node.

6. The method of claim 5, wherein selecting the node to act as the delegation node comprises identifying a node with an ETLD of zero by:
   beginning the iterative process at the ingress node; and
   repeating the iterative process until reaching the node with the ETLD of zero.

7. The method of claim 6, wherein:
   receiving the ETLD of the closest upstream node comprises receiving a path message from the closest upstream node; and
   passing the ETLD of the node to the next downstream node comprises forwarding the path message to the next downstream node.

8. The method of claim 7, further comprising, in response to selecting the node to act as the delegation node, resetting the ETLD of the selected node by:
   determining a limit on the number of labels the node is capable of imposing on the label stack of the packet; and
   setting the ETLD of the node to the determined limit.

9. The method of claim 8, further comprising:
- determining that the number of hops between the delegation node and the egress node exceeds the limit on the number of labels the delegation node is capable of imposing; and
- in response to determining that the number of hops between the delegation node and the egress node exceeds the number of labels the delegation node is capable of imposing, selecting at least one of the nodes between the delegation node and the egress node to act as an additional delegation node.

10. The method of claim 7, further comprising receiving, at the delegation node, a reservation message that indicates the labels that the delegation node is to impose on the label stack as the packet traverses toward the egress node.

11. The method of claim 7, further comprising including, within the labels that the ingress node forwards with the packet, a label that indicates the selected node is to act as the delegation node.

12. A system comprising:
- a receiving module, stored in memory, that receives, at an ingress node within a network, a request to forward a packet along a label-switched path to an egress node within the network;
- an identification module, stored in memory, that identifies a limit on the number of labels that the ingress node is capable of forwarding within a label stack of the packet;
- a determination module, stored in memory, that determines that the number of hops within the label-switched path exceeds the limit on the number of labels that the ingress node is capable of forwarding;
- a delegation module, stored in memory, that selects, based at least in part on the number of labels that the ingress node is capable of forwarding, at least one node within the label-switched path to act as a delegation node that imposes, onto the label stack of the packet, at least one label corresponding to a downstream node within the label-switched path;
- a forwarding module, stored in memory, that forwards the packet from the ingress node to the delegation node along the label-switched path to enable the delegation node to impose the label onto the label stack as the packet traverses toward the egress node; and
- at least one physical processor configured to execute the receiving module, the identification module, the determination module, the delegation module, and the forwarding module.

13. The system of claim 12, wherein the forwarding module further:
- receives the packet at one of the nodes within the label-switched path as the packet traverses toward the egress node;
- pops, from the label stack of the packet, a label that corresponds to a link that leads to a subsequent node within the label-switched path; and
- upon popping the label from the label stack, forwards the packet from the node to the subsequent node by way of the link.

14. The system of claim 13, wherein the delegation module further determines, for at least a portion of the nodes within the label-switched path, an effective transport label-stack depth (ETLD) that indicates the number of labels the node is capable of forwarding.

15. The system of claim 14, wherein:
the forwarding module forwards both:
- labels that correspond to links within the label-switched path; and
- additional labels that do not correspond to links within the label-switched path;

and
the delegation module determines the ETLD of the ingress node is by subtracting, from the total number of labels the ingress node is capable of forwarding, the number of labels the ingress node forwards that do not correspond to links.

16. The system of claim 15, wherein the delegation module further performs an iterative process of determining ETLDs of nodes within the label-switched path by:
- receiving, at a node from the closest upstream node, the ETLD of the closest upstream node;
- determining, at the node, the ETLD of the node by subtracting one from the ETLD of the closest upstream node; and
- passing the ETLD of the node to the next downstream node.

17. The system of claim 16, wherein the delegation module:
- selects the node to act as the delegation node by identifying a node with an ETLD of zero; and
- identifies the node with the ETLD of zero by:
  - beginning the iterative process at the ingress node; and
  - repeating the iterative process until reaching the node with the ETLD of zero.

18. The system of claim 17, wherein the delegation module:
- receives the ETLD of the closest upstream node by receiving a path message from the closest upstream node; and
- passes the ETLD of the node to the next downstream node comprises forwarding the path message to the next downstream node.

19. The system of claim 18, wherein the delegation module further resets the ETLD of the selected node by:
- determining a limit on the number of labels the node is capable of imposing on the label stack of the packet; and
- setting the ETLD of the node to the determined limit.

20. An apparatus comprising:
- at least one storage device that stores a plurality of labels that correspond to portions of label-switched paths within a network; and
- at least one physical processing device communicatively coupled to the storage device within a network node, wherein the physical processing device:
  - receives, at an ingress node within the network, a request to forward a packet along a label-switched path to an egress node within the network;
  - identifies a limit on the number of labels that the ingress node is capable of forwarding within a label stack of the packet;
  - determines that the number of hops within the label-switched path exceeds the limit on the number of labels that the ingress node is capable of forwarding; and
  - in response to determining that the number of hops within the label-switched path exceeds the limit on the number of labels that the ingress node is capable of forwarding:
    - selects, based at least in part on the number of labels that the ingress node is capable of forwarding, at least one node within the label-switched path to act as a delegation node that imposes, onto the label stack of the packet, at least one label corresponding to a downstream node within the label-switched path; and forwards the packet from the ingress node to the delegation node along the label-switched path to enable the delegation node to impose the label onto the label stack as the packet traverses toward the egress node.

* * * * *